United States Patent
Asai et al.

(10) Patent No.: US 6,984,353 B2
(45) Date of Patent: Jan. 10, 2006

(54) METHOD FOR MANUFACTURING A POLYIMIDE SLEEVE

(75) Inventors: Toshinobu Asai, Kawasaki (JP); Masaaki Oya, Kawasaki (JP); Takayuki Yamazaki, Kawasaki (JP)

(73) Assignee: Showa Electric Wire & Cable Co., Ltd., Kawasaki (JP)

( * ) Notice: Subject to any disclaimer, the term of this patent is extended or adjusted under 35 U.S.C. 154(b) by 436 days.

(21) Appl. No.: 10/158,878

(22) Filed: Jun. 3, 2002

(65) Prior Publication Data

US 2002/0182328 A1    Dec. 5, 2002

(30) Foreign Application Priority Data

Jun. 5, 2001    (JP) .................... P2001-169348

(51) Int. Cl.
  *B29C 41/08*    (2006.01)
  *B29C 41/14*    (2006.01)

(52) U.S. Cl. ............... 264/304; 264/255; 264/279; 264/336; 264/338

(58) Field of Classification Search ............... 264/304, 264/279, 255, 336, 338; 427/384, 430.1
See application file for complete search history.

(56) References Cited

U.S. PATENT DOCUMENTS 5,320,700 A * 6/1994 Hall et al. ............... 156/309.6
5,433,913 A * 7/1995 Kawauchi et al. ............ 264/306
5,759,655 A * 6/1998 Kitajima et al. ............ 428/36.91

FOREIGN PATENT DOCUMENTS

| JP | 56-126131 | | 10/1981 |
| JP | 1-165426 | | 6/1989 |
| JP | 3-180309 A | * | 6/1991 |
| JP | 03-261518 | | 11/1991 |
| JP | 07-076025 | | 3/1995 |

OTHER PUBLICATIONS

Japanese Official Action dated Dec. 28, 2004, issued in Japanese Patent Application No. 2001-169348, and English-language translation thereof.

* cited by examiner

*Primary Examiner*—Edmund H. Lee
(74) *Attorney, Agent, or Firm*—Finnegan, Henderson, Farabow, Garrett & Dunner, L.L.P.

(57) ABSTRACT

A method for manufacturing a polyimide sleeve where a polyimide sleeve of a high quality can be manufactured easily with a superior yield. A sleeve of a release resin is fitted on a planished metal core or a core at least whose outer surface is made of a release resin, and a polyimide precursor solution is applied on its outer surface. Next, after generating an imide reaction of the polyimide precursor by heating to form an almost completely cured polyimide sleeve, this polyimide sleeve is removed from the core together with the sleeve of the release resin. Furthermore, the polyimide sleeve is separated from the sleeve of the release resin.

9 Claims, 2 Drawing Sheets

METHOD FOR MANUFACTURING A POLYIMIDE SLEEVE

CROSS REFERENCE TO RELATED APPLICATIONS

This application is based upon and claims the benefit of priority from the prior Japanese Patent Application No. 2001-169348, filed on Jun. 5, 2001; the entire contents of which are incorporated herein by reference.

BACKGROUND OF THE INVENTION

1. Field of the Invention

This invention relates to a method for manufacturing a polyimide sleeve which can be used for a fixing apparatus of an electrophotograph copying machine and the like.

2. Description of the Related Art

In a copying or printing unit such as an electrophotograph copying machine, a facsimile or a laser beam printer, a heat-fixing system is generally adopted where a toner image of a hot-melt type resin etc. is formed on a recording sheet by an image forming process such as an electrophotography, an electrostatic recording, a magnetic recording, or the like so as to be fixed by heat.

For a fixing apparatus used in these heat fixing systems, a heat roller system has been conventionally utilized where a recording sheet on which a toner image is formed, is fed between two rollers of a heater-imbedded fixing roller and a pressure roller so as to fix the image, while a thin film belt fixing system has been developed and widely utilized recently where a film-shaped seamless sleeve (a polyimide sleeve) made of polyimide, polyamide-imide, or the like, or a sleeve whose outside surface is covered with a fluoropolymer is used in stead of the fixing roller.

In the fixing apparatus according to this system, a heater is placed inside of the polyimide sleeve, and the polyimide sleeve is pressed to the heater and a pressure roller is pressed to an outside of a portion of the polyimide sleeve which is pressed to the heater. Then a recording sheet, on which a toner image is formed, is passed through between portions of the polyimide sleeve which is pressed to the heater and the pressure roller, and the recording sheet is heated through the polyimide sleeve so that a toner image is heat-fixed.

Since a heat capacity is small for the polyimide sleeve which is a thin film, the system is characterized in that heat fixing can be available right after the power turned on as well as a required energy for heating can be decreased.

Additionally, a fixing apparatus using the above-described polyimide sleeve instead of the pressure roller has been developed recently.

In this fixing apparatus, a polyimide sleeve suspended among a plurality of rollers is pressed to an outer surface of a heater-imbedded fixing roller, and while rotating the fixing roller and the polyimide sleeve, a recording sheet on which a toner image is formed is passed through therebetween so as to be heat-fused.

Since an adequate fixing time can be secured even when transfer speed of a recording sheet is increased, this method is characterized in that speeding up of a machine can be achieved.

As for a method for manufacturing a seamless polyimide sleeve in use for these fixing systems, such a method is typically known that a polyimide precursor solution such as a polyamide acid solution is applied on an outside surface of a cylindrical metal core, and after being dried and subjected to an imide reaction by heating, a sleeve-like member is released from its core.

However, since polyimide is a polymer used as an adhesive, when the polyimide precursor solution is applied and subjected to the imide reaction by heating, the polyimide sleeve shrinks to fit strongly or adhere to the core, and it becomes difficult for the polyimide sleeve to be removed from the core.

Therefore, in order to make such a release from the core easy, methods have been further proposed as follows; (1) a method of applying a polyimide precursor solution on a core, heating it till sufficient strength at least as a sleeve-like member is obtained, and after released from the core once, baking it while being inserted again onto the core, (2) a method of providing small holes on a core, applying a polyimide precursor solution on the core, and after heated and baked, supplying an air pressure through the small holes from the inside of the core so that the sleeve is released from the core, (3) a method in which a release material such as a silicone oil is applied on a surface of a core, or the like.

However, in the method of (1) where a step of heating operation is repeated twice, there exist difficulties that the process is so complicated that productivity will decrease and that a yield of a product will also decrease since the sleeve is released and re-inserted during the imide reaction.

In the method of (2) where small holes are provided on the core, there exist difficulties that manufacturing cost of the core will increase while quality and a yield thereof will decrease since film is easy to come off and bend because of the air pressure given against a shrinking force of the sleeve.

In the method of (3) where the release material is applied on the surface of the core, such a new problem arises that while making it easy to separate the sleeve from the core, the core surface itself becomes hard to get wet, so that a crawling phenomenon and a flow phenomenon occur when a polyimide precursor solution is applied, whereby it will be difficult to apply it evenly in a desired thickness.

For this problem, methods have been proposed for making it easy to separate the sleeve from the core and repressing an occurrence of a crawling phenomenon, by covering a surface of the core with a heat-resistant resin of small interfacial contact angle in Japanese Patent Laid-Open Application No. 3-261518 JP-A for example, and by providing an inorganic coating layer on the surface of the core in Japanese Patent Laid-open Application No. 7-76025 JP-A. However, in both cases there exists a difficulty that making defects or coming off is likely to be caused since the surface strength of the covering layer and the adhesive strength to the core are not enough. With a few defects, a pinhole or a scar would be caused on the polyimide sleeve, which results in quality loss.

As noted above, while various modifications have been conventionally attempted to release the polyimide sleeve from the core easily, they have respective difficulties and a technique has not been established yet to easily manufacture a high quality polyimide sleeve with a superior yield.

SUMMARY OF THE INVENTION

Therefore, it is an object of the present invention to provide a method for manufacturing a high quality polyimide sleeve with a superior yield easily.

A method for manufacturing a polyimide sleeve relating to an embodiment of the present invention includes:

fitting a sleeve of a release resin right upon a core, at least an outer surface of the core being made of a release resin;

coating a polyimide precursor solution on an outer surface of the sleeve of the release resin;

generating an imide reaction of the polyimide precursor by heating to form an almost completely cured polyimide sleeve;

removing the polyimide sleeve from the core together with the sleeve of the release resin; and separating the polyimide sleeve from the sleeve of the release resin.

A method for manufacturing a polyimide sleeve relating to another embodiment of the present invention includes:

fitting a sleeve of a release resin right upon a planished metal core;

coating a polyimide precursor solution on an outer surface of the sleeve of the release resin;

generating an imide reaction of the polyimide precursor by heating to form an almost completely cured polyimide sleeve;

removing the polyimide sleeve from the core together with the sleeve of the release resin; and separating the polyimide sleeve from the sleeve of the release resin.

BRIEF DESCRIPTION OF THE DRAWINGS

While the present invention is described with reference to the drawings, these drawings are provided for the only illustrative purposes and have no intention to limit the invention in any case.

DESCRIPTION OF THE EMBODIMENTS

According to embodiments of this invention, it is possible to remove a polyimide sleeve easily from a core without damaging it. Moreover, since there is no need of repeating the step of removing and heating as conventional methods, the process is not complicated and there is no possibility of damaging the polyimide sleeve during a forming process. Furthermore, since a difficult processing technique is not required for manufacturing the core, manufacturing cost of the core does not increase considerably. In addition, a crawling phenomenon or a flow phenomenon does not occur when applying a polyimide precursor solution. Therefore, it is possible to manufacture a high quality polyimide sleeve easily with a superior productivity and a superior yield.

The embodiments of this invention will be described below by reference to the drawings hereinafter.

Figure 1:
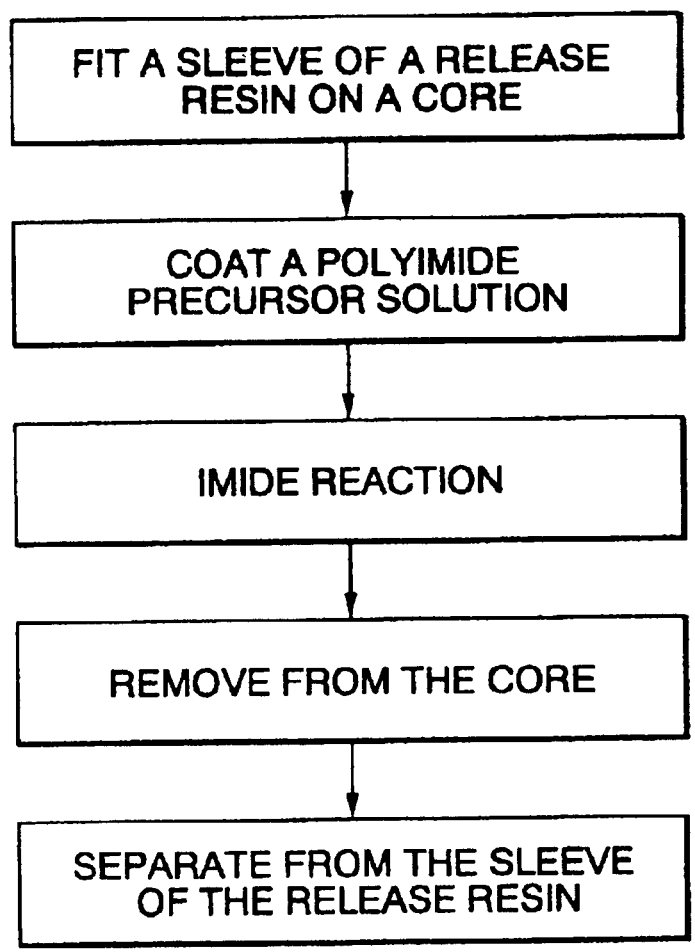
FIG. 1 is a view showing manufacturing steps of a polyimide sleeve relating to an embodiment of the invention.

FIG. 1 is a view showing manufacturing steps of a polyimide sleeve in reference to a first embodiment of the invention. First of all, a sleeve of a release resin is fitted on an outer surface of a core in this embodiment as shown in FIG. 1.

For the core to be used here, there are a core where a surface of a cylindrical or column-shaped core material made of metals such as aluminum or stainless steel, is planished by polishing and so on, a core made of the same core materials where a layer of a release resin is provided on its outer surface, a core where a layer of a release resin is provided on an outer surface of a cylindrical or column-shaped core material made of ceramics or a heat-resistant resin, and so on. A core formed of a release resin also can be used.

For the above-described release resin, a fluoropolymer, which is stable at the temperature of the imide reaction of the polyimide precursor, such as polytetrafluoroethylene (PTFE), tetrafluoroethylene-perfluoroalkylvinyl ether copolymer (PFA), tetrafluoroethylene-hexafluoropropylene copolymer (FEP), polyvinyl fluoride (PVF), polyvinylidene fluoride (PVDF), ethylene-tetrafluoroethylene copolymer (ETFE), or the like can be used.

When forming the release resin layer on the outer surface of the core material by using such a fluoropolymer, methods as follows are likely to be used; a method where dispersed fluoropolymers are applied and baked, a method where fluoropolymer powders are electrostatically coated and baked, or a method where a fluoropolymer film or a sleeve is fitted. The layer thickness of the release resin layer is likely to be in the range of 5 $\mu$m to 50 $\mu$m, and it is difficult to obtain a smooth release resin layer when the layer thickness is less than 5 $\mu$m while it is also difficult to obtain an even layer when the layer thickness is more than 50 $\mu$m.

For such a sleeve of the release resin to be fitted on the core, similarly to the above-described release resin, it is preferable to use a fluoropolymer which can is stable at the temperature of the imide reaction of the polyimide precursor, and it is more preferable to use a sleeve made of tetrafluoroethylene-perfluoroalkylvinyl ether copolymer (PFA) or tetrafluoroethylene-hexafluoropropylene copolymer (FEP).

The thickness of the sleeve of the release resin is likely to be in the range of 0.01 mm to 0.2 mm, and more preferably in the range of 0.02 mm to 0.1 mm. When the thickness is less than 0.01 mm, there is a probability of making the removing difficult due to an inadequate strength, and when the thickness is more than 0.2 mm, price increases while its economical efficiency decreases.

It is also preferable that an inside diameter thereof is a little smaller than an outside diameter of the core. By fitting the sleeve of the release resin having such a smaller diameter on the core while expanding the sleeve along a direction of its diameter, it is possible to obtain products of an improved adhesiveness to the core and with less variation in the inside diameter.

When using a core whose outside surface or all of which is made of the release resin, in order to avoid making it difficult to remove the sleeve of the release resin from the core due to fusion between the sleeve of the release resin and the core, it is preferable to use a release resin for the core having a melting point higher than the release resin for the sleeve. Specifically, a following combination is illustrated that polytetrafluoroethylene (PTFE) is used for the release resin of the core and a sleeve of tetrafluoroethylene-perfluoroalkylvinyl ether copolymer (PFA) or tetrafluoroethylene-hexafluoropropylene copolymer (FEP) is used for the sleeve of the release resin.

Next, the polyimide precursor solution is applied on the outer surface of the above-described sleeve of the release resin. For the polyimide precursor, one precursor is illustrated, which is obtained when reacting an aromatic diamine such as 3,3'-dimethyl-4,4'-diamino biphenyl, 3,3'-diaminodiphenyl ether, 4,4'-diaminodiphenyl ether, p-phenylenediamine, or the like and an aromatic tetracarboxylic acid such as 3,3',4,4'-biphenyltetracarboxylic acid dianhydride, pyromellitic acid dianhydride, benzophenone-3,3',4,4'-tetracarboxylic acid dianhydride, or the like in an organic polar solvent such as N-Methyl-2-pyrrolidone (NMP), dimethylacetamide, dimethylformamide or the like. These are used by dissolving them in a solvent and by adjusting their viscosity suitable to being applied on the core.

Figure 2:
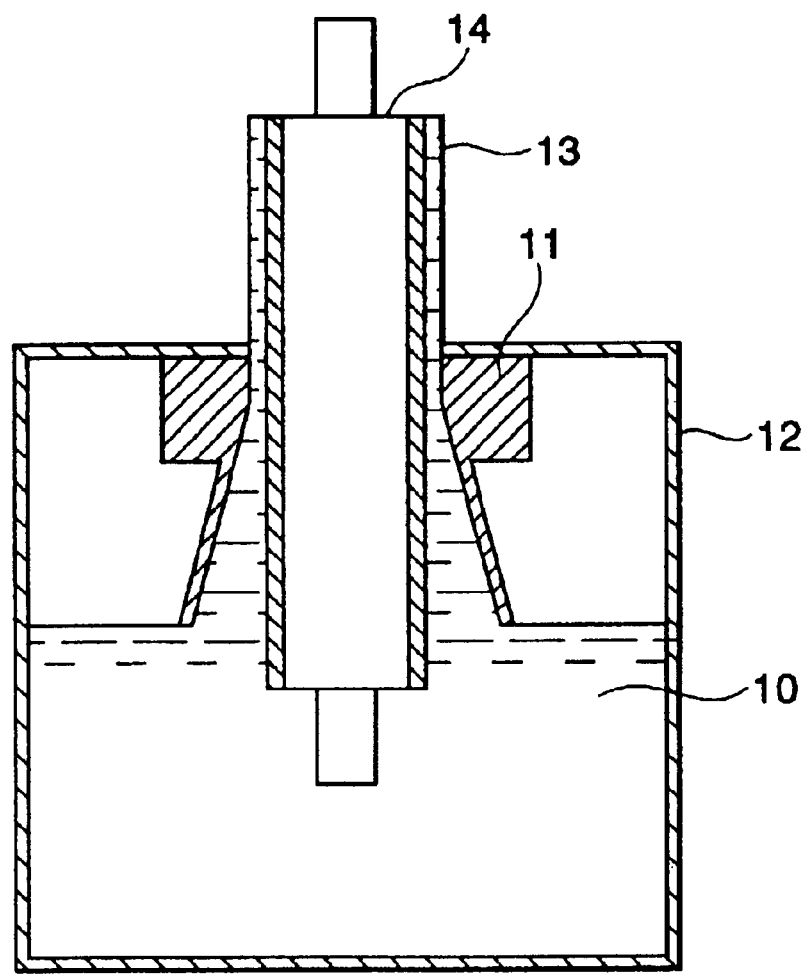
FIG. 2 is a view showing a method of coating a polyimide precursor solution on a core relating to an embodiment of the invention.

Although a method for applying the thus-adjusted polyimide precursor solution on the outer surface of the sleeve of the release resin is not limited particularly, it is preferable to perform a so-called pulling method as shown in FIG. 2 where a core 14 on which a sleeve 13 of a release resin is fitted, dipped while being kept upright in a dipping bath 12 which accommodates a polyimide precursor solution 10 and is attached with dies 11 at an upper side to remove an extra of the solution 10, so that the core 14 is pulled upwards through the dies 11, whereby the polyimide precursor solution 10 can be easily applied on the outer surface of the sleeve 13 of the release resin evenly in a desired thickness.

After the polyimide precursor solution is applied on the outer surface of the sleeve 13 of the release resin in this manner, this sleeve is heated by leaving it in a heating oven etc. to be subjected to the imide reaction of the polyimide precursor. The imide reaction means a condensation reaction where a polyimide precursor dehydrates to be a closed circular by heating so as to become polyimide, and it is said that the imide reaction hardly precedes at about room temperature and usually completes by stepwise heating up to a glass transition temperature of the polyimide.

For a heating method to generate the imide reaction of the polyimide precursor, it is preferable to perform a so-called step heating method where after the solvent is evaporated to form a film made of the polyimide precursor, the polyimide precursor is heated up to the imide reaction temperature. By adopting such a method, a precise polyimide sleeve in an even thickness can be formed.

After forming the sleeve mainly made of polyimide on the sleeve of the release resin on the core in this manner, the core is taken from the heating oven to be cooled down to room temperature, and subsequently the sleeve mainly made of the polyimide which is formed on the surface is removed from the core together with the sleeve of the release resin. The sleeve of the release resin is separated and removed thereafter. Since the sleeve mainly made of the polyimide is released together with the sleeve of the release resin, and from the core which is improved in release characteristics by planishing, by using a releasable resin, or the like, it can be removed from the core easily.

The method for manufacturing the polyimide sleeve according to the present invention is suited to manufacturing a polyimide sleeve in a thickness of 0.01 mm to 0.2 mm.

The manufacturing method according to this invention can be applied to manufacturing such a sleeve that has a layer of, for example, a fluoropolymer on the polyimide sleeve, or a sleeve that is a composite structure having a layer of silicone rubber and a layer of a fluoropolymer in this order on the polyimide sleeve. In this case, after forming the sleeve mainly made of polyimide on the outer surface of the core, it is desirable to form a layer of a fluoropolymer, or a layer of silicone rubber and a layer of a fluoropolymer by usual method, and subsequently to remove the composite sleeve from the core together with the sleeve of the release resin so as to separate and remove the sleeve of the release resin.

The invention will now be explained specifically in the following examples.

EXAMPLE 1

A core was manufactured by applying a PTFE dispersion (a trade name of "POLYFLON PTFE ENAMEL" from DAIKIN INDUSTRIES, Ltd.) in a thickness of 20 $\mu$m on an outer surface of a stainless steel (SUS 304) tube having an inside diameter of 50 mm, a length of 400 mm, and a wall thickness of 0.5 mm, and baking it to form a PTFE layer.

After fitting a PFA sleeve having an outside diameter of 48 mm and a thickness of 50 $\mu$m, to the above-described core while expanding this sleeve along a direction of its diameter, and applying a polyimide varnish (a trade name of "U varnish-S" from UBE INDUSTRIES, LTD; solid contents of 20%, NMP solvent) on the outside surface in a thickness of 160 $\mu$m by the pulling method as shown in FIG. 2, heating operations are performed at 150 degrees centigrade for 1 hour, at 220 degrees centigrade for 1 hour, and at 290 degrees centigrade for 1 hour. Thereafter, it was cooled down to room temperature, and the polyimide sleeve was removed from the core together with the PFA sleeve to separate the polyimide sleeve from the PFA sleeve. The sleeve was easily removed by pressing it lightly in an axial direction while blowing compressed air between the core and the PFA sleeve by an air gun.

The obtained polyimide sleeve had an inside diameter of 50.1 mm and a thickness of about 30 $\mu$m, and any defects, creases, undulations, or the like was not recognized.

EXAMPLE 2

A polyimide sleeve was manufactured similarly to the Example 1 except that a stainless steel (SUS 304) tube having an outside diameter of 50 mm, a length of 400 mm, and a thickness of 0.5 mm whose outer surface is planished is used as a core. Similar to the Example 1, the polyimide sleeve was easily removed from the core only by pressing it lightly in the axial direction while blowing compressed air between the core and the PFA sleeve by the air gun.

The obtained polyimide sleeve had an inside diameter of 50.1 mm and a thickness of about 30 $\mu$m, and any defects, creases, undulations, or the like was not recognized.

COMPARATIVE EXAMPLE

After applying a polyimide varnish (a trade name of "U varnish-S" from UBE INDUSTRIES, LTD; solid contents of 20%, NMP solvent) on an outside surface of a core manufactured in the same manner as Example 1 in a thickness of 160 $\mu$m by the pulling method as shown in FIG. 2, heating operations are performed at 150 degrees centigrade for 1 hour, at 220 degrees centigrade for 1 hour, and at 290 degrees centigrade for 1 hour. Thereafter, it was cooled down to room temperature, and although it was tried to remove the polyimide sleeve from the core, the polyimide sleeve adhered to the core too strongly to be removed.

Although the method in accordance with the present invention has been described in connection with embodiments, various other modifications and/or alterations to the described embodiments may be made by those skilled in the art without departing from the spirit and the scope of the invention specified in the appended claims.

What is claimed is:

1. A method for manufacturing a polyimide sleeve, comprising:
   fitting a sleeve of a release resin right upon a core, at least an outer surface of the core being made of a release resin;
   coating a polyimide precursor solution on an outer surface of the sleeve of the release resin;
   generating an imide reaction of the polyimide precursor by heating to form an almost completely cured polyimide sleeve;
   removing the polyimide sleeve from the core together with the sleeve of the release resin; and
   separating the polyimide sleeve from the sleeve of the release resin.

2. The method for manufacturing a polyimide sleeve according to claim 1,
wherein each of the release resins for the core and the sleeve is stable at the temperature of the imide reaction of the polyimide precursor.

3. The method for manufacturing a polyimide sleeve according to claim 1,
wherein the release resin of the core has a melting point higher than the release resin of the sleeve.

4. The method for manufacturing a polyimide sleeve according to claim 1,
wherein the release resin of the core comprises a fluoropolymer.

5. The method for manufacturing a polyimide sleeve according to claim 1,
wherein the release resin of the core comprises polytetrafluorethylene.

6. The method for manufacturing a polyimide sleeve according to claim 1,
wherein the sleeve of the release resin comprises a fluoropolymer.

7. The method for manufacturing a polyimide sleeve according to claim 1,
wherein the sleeve of the release resin comprises a tetrafluoroethylene-perfluoroalkylvinyl ether copolymer or a tetrafluoroethylene-hexafluoropropylene copolymer.

8. The method for manufacturing a polyimide sleeve according to claim 1,
wherein the sleeve of the release resin has a thickness of 0.01 mm to 0.2 mm.

9. The method for manufacturing a polyimide sleeve according to claim 1,
wherein the polyimide sleeve has a thickness of 0.01 mm to 0.2 mm.

* * * * *